(12) United States Patent
Leu et al.

(10) Patent No.: US 10,223,420 B2
(45) Date of Patent: *Mar. 5, 2019

(54) TABLE PLACEMENT IN DISTRIBUTED DATABASES

(71) Applicant: SAP SE, Walldorf (DE)

(72) Inventors: Hans-Joerg Leu, Dossenheim (DE);
Christian Bensberg, Heidelberg (DE);
Johannes Beigel, Rauenberg (DE);
Jochen Becker, Haseluenne (DE);
Carsten Mueller, Bruchsal (DE)

(73) Assignee: SAP SE, Walldorf (DE)

( * ) Notice: Subject to any disclaimer, the term of this patent is extended or adjusted under 35 U.S.C. 154(b) by 57 days.

This patent is subject to a terminal disclaimer.

(21) Appl. No.: 15/160,771

(22) Filed: May 20, 2016

(65) Prior Publication Data

US 2016/0267141 A1    Sep. 15, 2016

Related U.S. Application Data

(63) Continuation of application No. 14/090,799, filed on Nov. 26, 2013, now Pat. No. 9,372,907.

(51) Int. Cl.
*G06F 17/30* (2006.01)

(52) U.S. Cl.
CPC .. *G06F 17/30486* (2013.01); *G06F 17/30371* (2013.01); *G06F 17/30575* (2013.01)

(58) Field of Classification Search
CPC ...................................................... G06F 17/30
USPC ....................................................... 707/790
See application file for complete search history.

(56) References Cited

U.S. PATENT DOCUMENTS

| | | | | |
|---|---|---|---|---|
| 5,970,495 | A * | 10/1999 | Baru | G06F 9/5088 |
| 7,047,510 | B1 * | 5/2006 | Chopra | G06F 17/504 |
| | | | | 716/106 |
| 8,078,825 | B2 * | 12/2011 | Oreland | G06F 17/30336 |
| | | | | 711/114 |
| 8,176,196 | B2 * | 5/2012 | Katsunuma | G06F 17/30516 |
| | | | | 382/303 |
| 8,244,846 | B2 * | 8/2012 | Wong | G06F 9/5083 |
| | | | | 709/217 |
| 8,458,299 | B2 * | 6/2013 | Lin | G06F 17/30197 |
| | | | | 707/821 |
| 8,490,106 | B2 * | 7/2013 | Imura | G06F 9/5077 |
| | | | | 709/226 |
| 9,372,907 | B2 | 6/2016 | Leu et al. | |
| 2013/0232133 | A1 * | 9/2013 | Al-Omari | G06F 17/30498 |
| | | | | 707/714 |

* cited by examiner

*Primary Examiner* — Kim T Nguyen
(74) *Attorney, Agent, or Firm* — Mintz Levin Cohn Ferris Glovsky and Popeo, P.C.

(57) ABSTRACT

A node type of a plurality of distributed nodes to which a table to be added to a distributed database should be assigned can be identified by applying a set of placement rules defined for the table. The set of placement rules can also be applied to determine whether the table should be partitioned into more than one partition. A table group name associated with the table can be obtained and used in conjunction with the node type and determination of whether to partition the table to store the table in the distributed database on at least one node of the plurality of nodes as one or more partitions.

14 Claims, 9 Drawing Sheets

| Schema Name | Table Name | Group Type | Subtype | Group Name | Location | Partitioning Threshold | Initial Partitions | Re-partitioning Threshold |
|---|---|---|---|---|---|---|---|---|
| SCHEMA1 | /BIC/Table 1 | GROUP1 | | | slaves | 40 million | 3 | 40 million |
| SCHEMA1 | /BIC/Table 2 | | | | master | | 1 | 1 |
| ERP_RE | /BIC/Table 3 | MYTYPE | | | All | | | |
| ERP_RE | /BIC/Table 4 | | | | slaves | 60 million | 3 | 40 million |

FIG. 4

TABLE PLACEMENT IN DISTRIBUTED DATABASES

RELATED APPLICATION

This application is a continuation under 35 U.S.C. § 120 of U.S. patent application Ser. No. 14/090,799 entitled "TABLE PLACEMENT IN DISTRIBUTED DATABASES" and filed Nov. 26, 2013, which is incorporated by reference herein in its entirety.

TECHNICAL FIELD

The subject matter described herein relates generally to database management, and specifically to balancing resource use in a distributed database.

BACKGROUND

Many organizations make use of software applications to optimize business operations by analyzing large amounts of data in real time. Such applications need to be extremely efficient, and need to be able to provide analyses on very large relational databases having information stored in tables in a distributed manner on multiple nodes. A node may be a server or a virtual server, and nodes may be connected via a computing bus, a local area network (LAN), a wide area network (WAN), a storage area network (SAN), the Internet, or the like. These nodes may reside in the same location, or they may be stored in remote locations. When an application runs a query on the database, it may need to access data from more than one database table. As a part of running the query, database tables may need to be joined. If the tables to be joined do not reside on the same node, one or more of these tables would need to be sent over the network so that the can be performed on a single node. The transferring of data between nodes to join tables can be very taxing and can create a bottleneck for the whole procedure, especially for joins requiring large amounts of data to be transferred.

SUMMARY

In some aspects of the current subject matter, computer-implemented methods can include features relating to placement of tables or table partitions in a distributed database in which tables or table partitions are stored on multiple computing nodes. A set of placement rules defined for the table can be applied to determine whether the table should be partitioned into more than one partition, a node type onto which the table or table partition should be stored, and a table group name to store the table or table partition in an optimal manner within the distributed database.

Also described are articles (also referred to as computer program products) that comprise a tangibly embodied (e.g. non-transitory) machine-readable medium operable to cause one or more machines (e.g., computers, etc.) to result in operations described herein. Similarly, computer systems are also described that may include computer circuitry, such as for example a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows a sample table of table placement rules for database tables of a distributed relational database;

When practical, similar reference numbers denote similar structures, features, or elements.

DETAILED DESCRIPTION

Storage of very large amounts of data within a database typically involves a distributed relational approach across multiple nodes. Data are stored in database tables, and these tables may be distributed amongst multiple nodes. Depending on their size, certain tables may be partitioned, and such a table may be distributed amongst a number of nodes. Criteria for determining the nodes and the approach for distributing database tables and database table partitions may include query performance, physical hardware resource constraints, and the like.

For example, when an application performs queries requiring data from multiple database tables, the query joins the tables, or parts of these tables, before any aggregation, or other activities can be performed. If the tables do not reside on the same node, the tables (or relevant parts thereof) that reside on remote nodes need to be transported across the network. Since the amount of data may be very large, this transferring of an entire table, or parts thereof, typically slows down execution time of the query. If the tables required by a query were on the same node, joining and aggregating the data on one node can be completed with significant query performance improvements.

Figure 1:
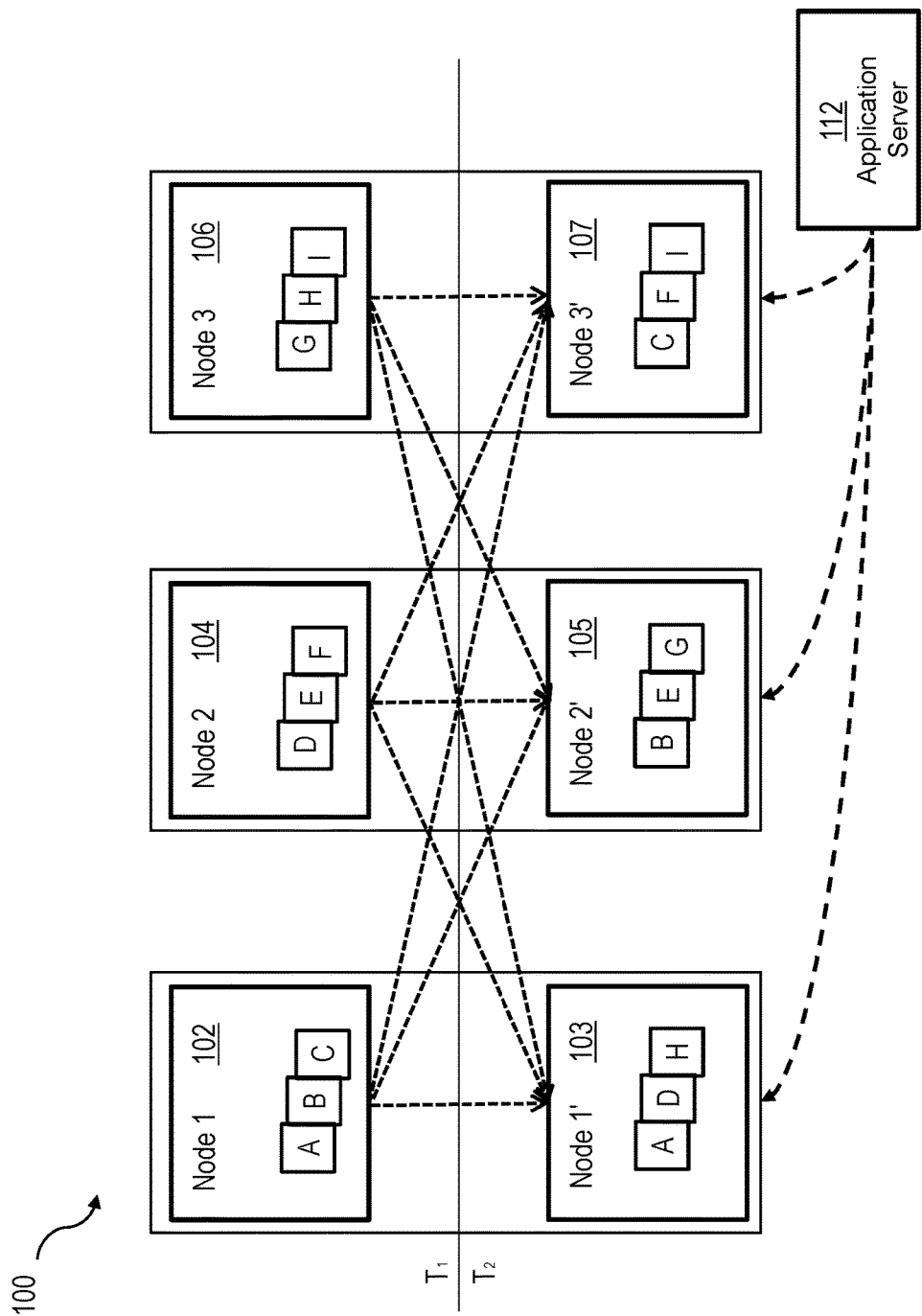
FIG. 1 shows a diagram illustrating table redistribution between nodes of a distributed database.

FIG. 1 shows a diagram illustrating table redistribution between nodes of a distributed relational database 100, consistent with implementations of the current subject matter. First, second, and third nodes (Node 1, Node 2, and Node 3, respectively) 102, 104, 106, are nodes of the distributed database 100, before table redistribution at time T1. The first node 102 contains database tables A, B and C. The second node 104 and the third node 106 contain database tables D, E, F and G, H, I, respectively. After table redistribution, e.g. at time T2, the contents of the nodes are redistributed as shown in the first node (Node 1') 103, second node (Node 2') 105, and third node (Node 3') 107. An application server 112 is shown communicating with the first, second, and third nodes 102, 104, 106 before table redistribution at time T1, and with these same nodes 103, 105, 107 after table redistribution at time T2.

A user within an organization may want to run a query to analyze data related to business intelligence, or for other purposes. Such a query can be executed by the application server 112. This first query involves the aggregation and analysis of data residing in tables A, D and H. Before table redistribution at time T1, the application server 112 needs to communicate with node 102 for table A, node 104 for table D and node 106 for table H, and tables A, D and H need to be joined before performing the query on these tables. In order to be able to join tables A, D and H, the tables, or results sets from within the tables, need to be moved across the network and reside temporarily at the same location, which could be on one of the nodes, or a storage or memory location. Database tables A-I may be very large, and transferring such tables over a network, may take an unacceptably long amount of time. Even a few seconds delay can typically result in a negative end user experience, and delays of many seconds or minutes are generally unacceptable, in particular in high-performance in-memory database systems in which transfer of large tables between nodes can readily become the key performance bottleneck. As such, minimizing or removing this bottleneck can result in significant improvements of efficiency and perceived performance when making database queries.

After table redistribution, e.g. at time T2, tables D and H have been redistributed onto Node 1' 103, while table A remains on Node 1' 103 having not been moved. In this example, if the application server needs to implement a query requiring tables A, D, and H, there would be no need to transfer any tables to join them, since they already reside on Node 1' 103. As such, the query requiring tables A, D and H would run much more efficient and quickly than prior to redistribution. A similar description applies to an example query requiring data from tables B, E and G, as well as to an example query requiring data from tables C, F and I. This example is merely illustrative. Other numbers of nodes and tables within nodes are within the scope of the current subject matter. Additionally the number of tables required for a query may vary. This example shows the redistribution of entire tables. However, in other implementations of the current subject matter, parts of tables can be distributed onto different nodes.

Figure 2:
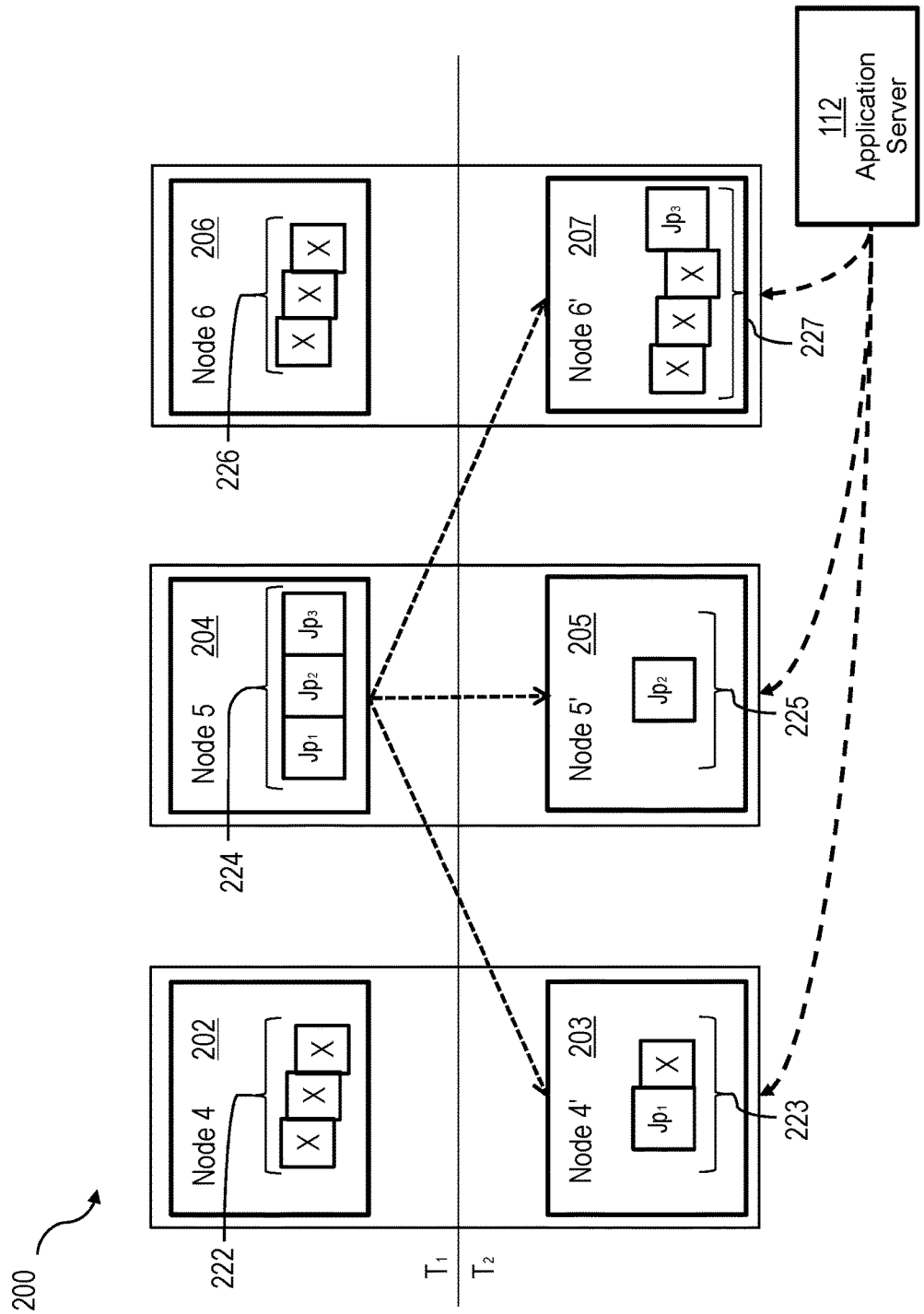
FIG. 2 shows a diagram illustrating table redistribution implementing an aspect of table placement rules in which table and table partitions are distributed between nodes of a distributed relational database.

FIG. 2 shows a diagram illustrating table redistribution implementing an aspect of table placement rules in which table and table partitions are distributed between nodes of a distributed relational database 200, consistent with implementations of the current subject matter. In this example, a database table that initially resides on one node is partitioned into three parts, and distributed onto three nodes. Table placement rules, which are described later in reference to FIG. 4, can define how the table is partitioned and where the partitions need to be located. Table redistribution, when applied, can redistribute tables and table partitions onto nodes using table classifications (described below in reference to FIG. 3), table placement rules, physical hardware constraints of the nodes, etc. The distributed database 200 shown in FIG. 2 is similar to the distributed database 100 of FIG. 1, and Nodes 4, 5 and 6 (respectively labeled 202, 204 and 206 in FIG. 2) and Nodes 4', 5' and 6' (respectively labeled 203, 205 and 207 in FIG. 2) illustrate a similar before and after table redistribution as in FIG. 1. Node 5 204 contains a table J 224, which can be divided into three partitions Jp1, Jp2, and Jp3. Node 4 202 and Node 6 206 each contain three tables ("X") labeled 222 and 226, whose actual contents are less relevant in this example. At time T2, after implementation of table redistribution table placement rules consistent with implementations of the current subject matter, the three partitions Jp1, Jp2, and Jp3 are redistributed onto Node 4' 203, Node 5' 205, and Node 6' 206.

Figure 3:
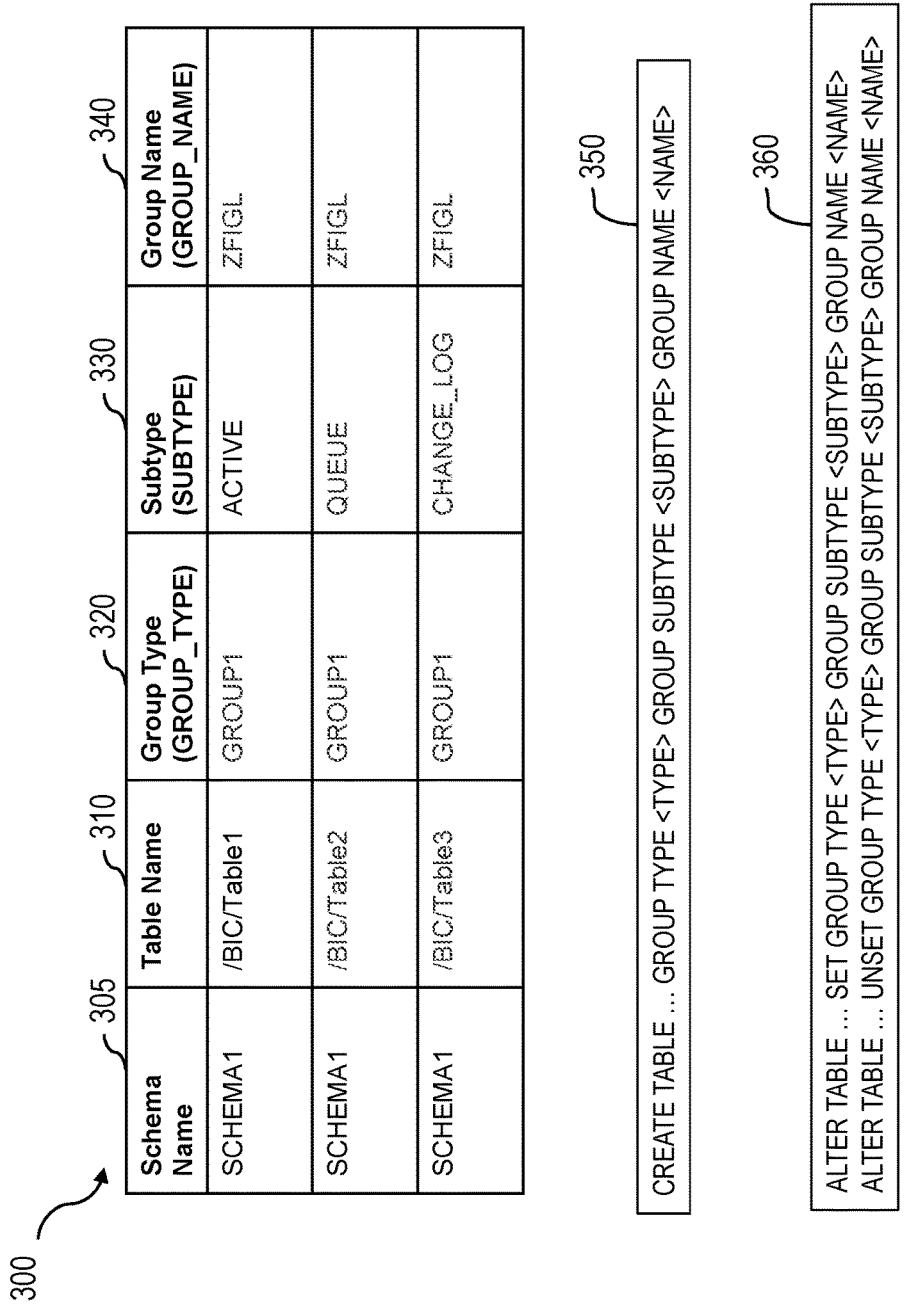
FIG. 3 shows a sample table of table classification information for database tables of a distributed relational database.

FIG. 3 shows a sample table of table classification information 300 for database tables of a distributed relational database, consistent with implementations of the current subject matter. Table classification information 300 is used to define the relationship between tables such that query performance considerations and/or other criteria, parameters, etc., are taken into account. Either or both of table placement rules and table redistribution procedures consistent with implementations of the current subject matter can optionally use table classification information, as is explained below in reference to FIG. 4 and FIG. 5. Table classification information 300 can include metadata describing a database table.

In some cases, a single database table is not the sole storage location for data used or otherwise accessed by a particular application, but is instead closely related to other tables that are also associated with that application. Table classification functionality can allow table redistribution or table placement rules to recognize similar or associated database tables, thereby allowing table redistribution to optimally distribute database tables based at least in part on their database table classification, to different nodes in a distributed database. In this manner, database tables that are regularly joined can be stored on a same node instead of being stored on separate nodes. Such an approach can avoid or at least reduce the need for a table, or parts of a table to be transferred between nodes (e.g. across a network connection) when SQL join statements or other operations required for responding to a query are executed. Instead, database tables that are stored on the same node can join locally, which results in significant query performance improvements.

FIG. 3 illustrates an example listing of table classification information 300 for three database tables within a given database schema name 305 (in this example, "SCHEMA1"). For each table having a respective table name 310, the table classification information 300 can include a group type 320, a subtype 330, and/or a group name 340. For example, the table classification information 300 for the database tables of a specific application object are classified as the group type 320 GROUP1, and with ZFIGL as the group name 340. All of the tables in this example have the group type 320 GROUP1 and are therefore identified as tables of the application object. The subtype 330 can differ depending on the use of each of the individual tables. The table classification information 300 can be used as discussed below in association with table placement rules and/or table redistribution parameters to identify associations between tables or table partitions such that associated tables or table partitions can be placed or redistributed among nodes of a distributed database in an advantageous manner.

Table classification information 300 can be specified when creating a new table or for an existing table. When creating a table or a table partition, the table classification information 300 can be used in conjunction with table placement rules, e.g. as illustrated in FIG. 4, to identify onto which type of server, onto which node, etc. the newly created table or table partition should be placed. SQL create commands 350 are an example of software commands used to assign table classification information 300 to a table when creating a new table. SQL alter commands 360 are examples of software commands used to assign table classification information 300 to an existing table.

A management repository (not shown in FIG. 3) can store the table classification information 300 as a way of tracking the table classification information 300. All database tables for which a group type 320, subtype 330, or group name 340 is specified can have an entry in this repository.

FIG. 4 shows a sample table of table placement rules 400, which is composed of table classification information 412 similar to that shown in FIG. 3, with some additional table placement rules 414, consistent with implementations of the current subject matter. Table placement rules can be assigned to tables based on some or all of classification information 412 and can define an expected behavior for the tables on the distributed database. Examples of table placement rules provided are location 422, and partition splitting rules (including parameters: partitioning threshold 424, and initial partitions 426). Other examples may include other table placement rules.

A table placement rule 414 may be assigned to place a table at a location based on all or a part of the table classification information, for example, the combination of a schema name 305 and a group type 320. Following the provided example, a combination of schema name SCHEMA1 and group type GROUP1 should be placed at locations, slaves. The location options are slaves, master, or All and are server types. Table redistribution can use these table placement rules and can balance the tables across the nodes specified as these server types, using database landscape makeup and hardware constraint information. Similar location rules may be assigned based on other parameters of table classification information 412. A rule applied to more specific classification information 422 can take precedence over a more general rule. For example a rule specifying schema 305, group type 320 and group name 340 can overwrite the prior, more general example provided, for the corresponding tables.

Another example of table placement rules can include table partitioning rules. FIG. 2 provided an example of partitioning a table onto multiple nodes. Examples of table placement rules defining under what conditions, into how many parts and to which locations to distribute the partitions are described in additional detail below. A partitioning threshold 424 and an initial number of partitions 426 are two parameters used to define partitioning rules. A repartitioning threshold 428 is also explained in the next section.

Partitioning a table and distributing its partitions onto multiple nodes may be beneficial when a table is very large, but is not beneficial when a table is small. Accordingly, a rule defining a threshold table size at which to implement table partitioning can be advantageously applied. The partitioning threshold parameter 424 can define a minimum number of records that must exist in a table before table partitioning takes place. If partitioning is required, the initial partitions parameter 426 can specify into how many initial partitions to partition the database table. The location parameter 422 can also be used to assign the partitions to specific server type locations, in a similar manner as was previously discussed. Following the example from FIG. 4, if BIC/Table 1 has more than 40 million records, it will be divided into three partitions, and these partitions will be placed on slave type servers.

In some cases, at least one of the tables that share a group name 340 may require partitioning. By default, all tables with the same group name 340 will be partitioned into the same number of partitions. The number of partitions is determined by the largest table within the group. A specific table redistribution behavior parameter can be set to alter this behavior such that tables that share a group name 340 will not be partitioned together into the same number of partitions as the largest table within the group.

Another specific table redistribution behavior parameter may be set to force the execution of operations that change the number of partitions that a table will be partitioned into. For example, if a table has two partitions but should have three according to the table redistribution rules, the table redistribution process would not, by default, adjust this, unless the specific table redistribution behavior parameter is set to force the adjustment of the table partitioning requirement.

Additionally, there may be other partitioning parameters in the table placement rules, for example a repartitioning threshold parameter 428. The partitions of a partitioned database table can still be very large and require re-partitioning. In the re-partitioning case, the re-partitioning threshold parameter 428 value can define a number of records in a partitioned table that triggers a re-partitioning. Once a table has been partitioned with the specified initial number of partitions, for performance reasons, the table can be repartitioned only by doubling the number of partitions. Extending the previous example where tables with more than 40 million records are divided into three partitions, if the individual partitions have more than 40 million entries on average, these are halved again in accordance with the partitioning threshold parameter 428 value. In other words, if the initial number of partitions is three, this would result in six partitions being created during a re-partitioning. However, creation of more partitions than the number of available nodes can advantageously be avoided. For example, if a distributed database only has five nodes, the repartitioning described above, from three partitions to six partitions, would not take place.

A management repository (not shown in FIG. 4) can store the table placement rules 414 in association with table classification information 412 to keep track of the table placement rules 414. An entry in this repository can reflect table placement rule parameters as discussed herein. This management repository can be an expanded version of the management repository discussed in FIG. 3, or can be a separate additional management repository.

An example of table partitioning as described is controlling the number of level 1 partitions to split a table into. Level 1 partitioning splits a table based on a hash function which uses hash function input parameters such as document numbers and line items. An example of another type of table partitioning is a Level 2 partitioning, where the partitions are defined and managed by an application that uses the tables.

Figure 5:
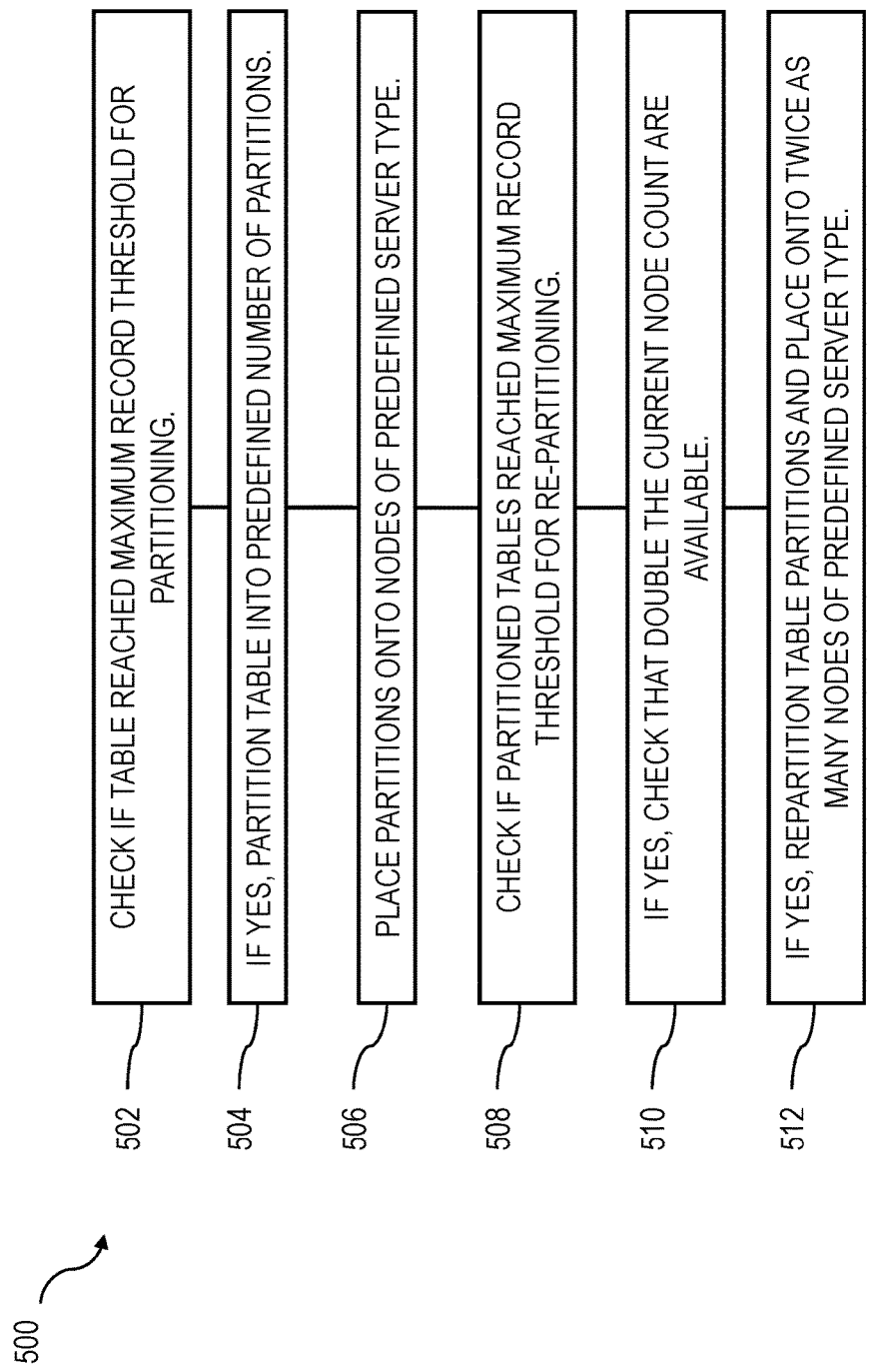
FIG. 5 and FIG. 6 show a process flow diagrams illustrating features of table placement methods in a distributed database.

FIG. 5 shows a process flow diagram 500 illustrating features that can be included in a table placement method in a distributed database. At 502, a database engine, or another implementing entity checks if a number of records in a database table has reached a predefined maximum record threshold, which can be defined as a partitioning parameter 424. If the number of records does not exceed the predefined maximum record threshold, then no table partitioning is performed on the database table. If the number of records does exceed the predefined maximum record threshold, then at 504, the implementing entity partitions the database table into the number of partitions as defined by the initial partitions parameter 426. At 506 the partitioned table portions are placed onto nodes of a predefined server type as defined by the location parameter 422.

At 508, the implementing entity optionally either immediately thereafter, or at some later time checks to see if the average of the table partitions have reached the predefined maximum record threshold for re-partitioning. If not, then no table re-partitioning is performed on these table partitions. If yes, then at 510, the implementing entity checks that double the current node count are available, and if yes then at 512 the implementing entity re-partitions the table partitions and places them onto double the nodes of the predefined server type as defined by the location parameter 422.

Figure 6:
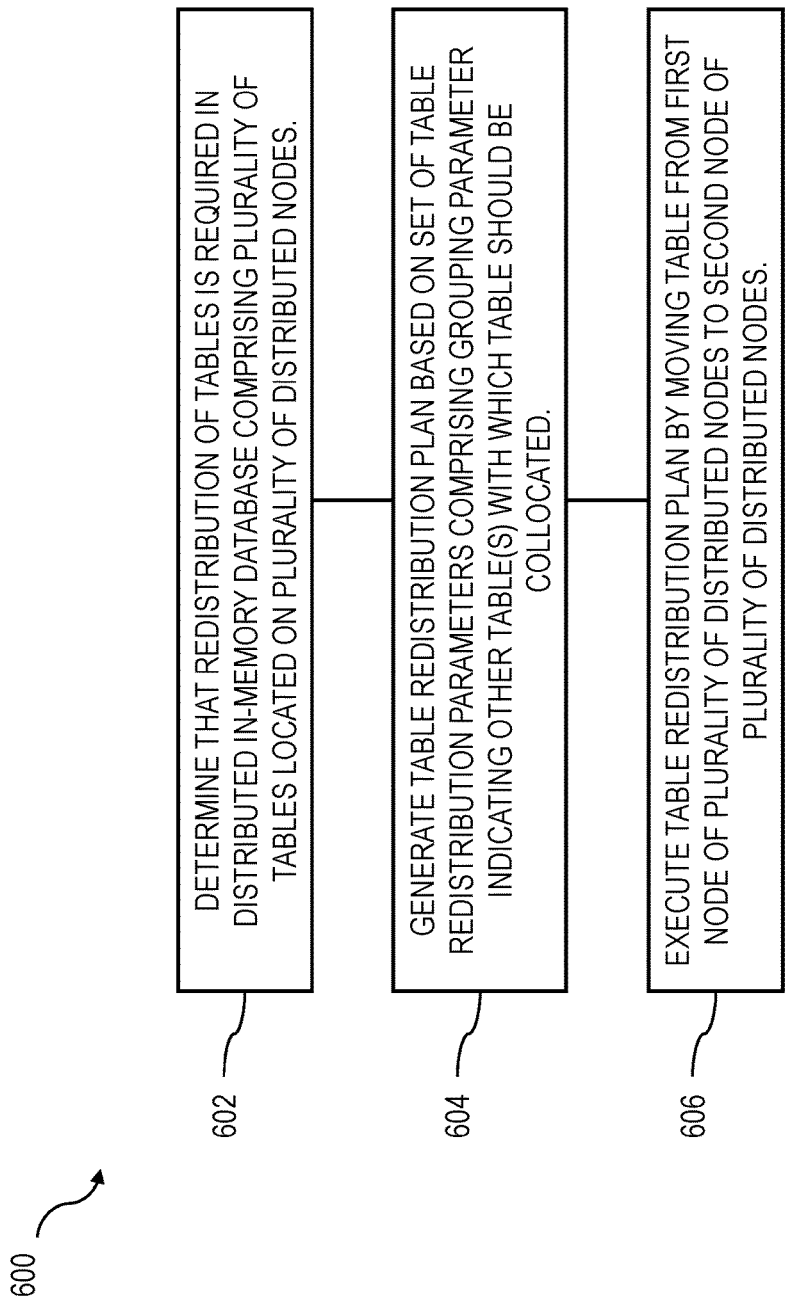

FIG. 6 shows another process flow diagram 600 illustrating features that can be included in a table placement method in a distributed database. At 602, a determination can be made that a redistribution of a plurality of tables is required in a distributed in-memory database that includes a plurality of tables located on a plurality of distributed nodes. Based at least in part on a set of table redistribution parameters, at 604 a table redistribution plan that includes redistribution of a table of the plurality of tables is generated. The set of table redistribution parameters includes a grouping parameter indicating at least one other table with which the table should be collocated. At 606, the table redistribution plan is executed, which includes moving the table from a first node of the plurality of distributed nodes to a second node of the plurality of distributed nodes.

Figure 7:
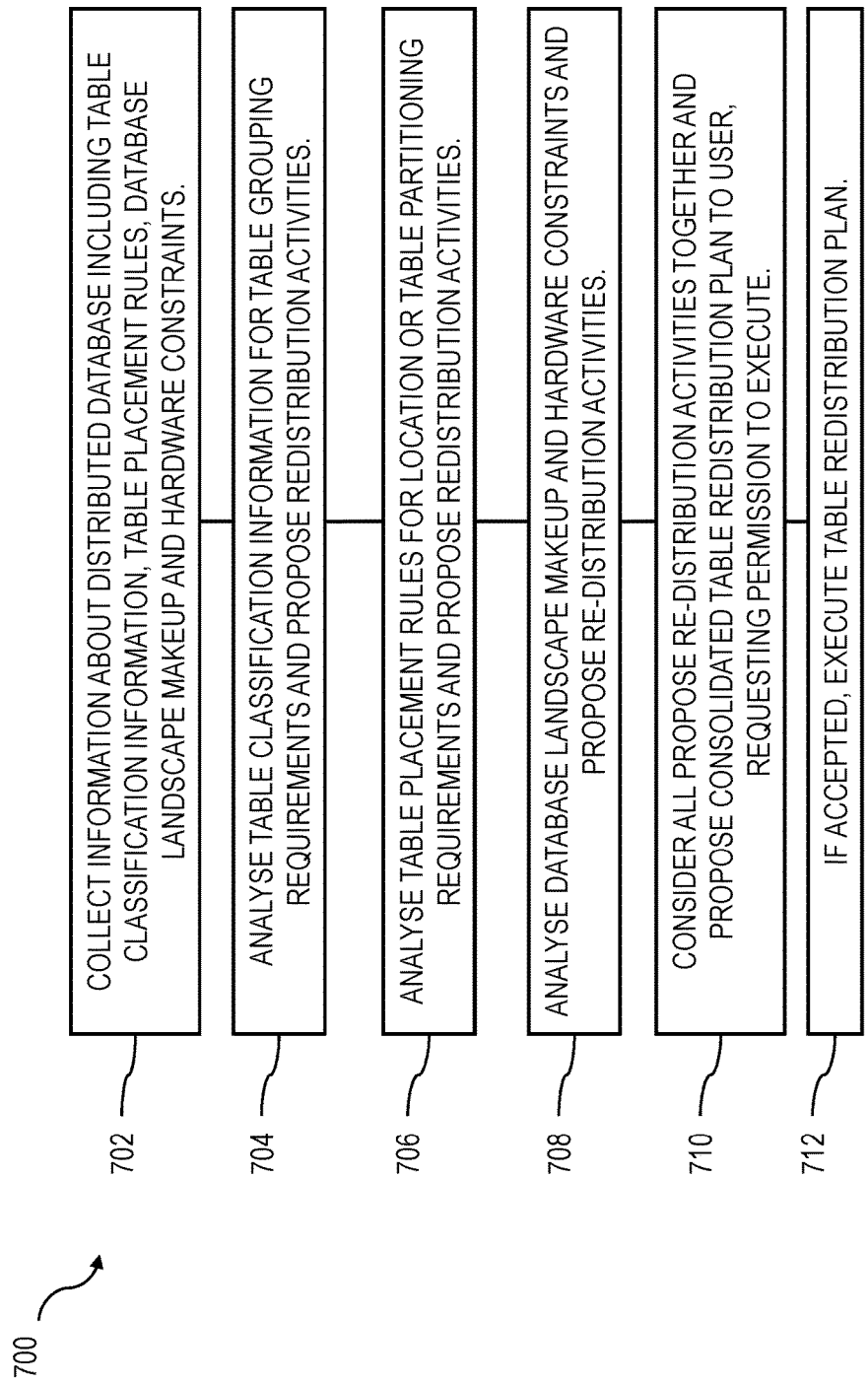
FIG. 7 and FIG. 8 show process flow diagrams illustrating features of methods for redistributing database tables in a distributed database.

FIG. 7 shows a process flow diagram 700 illustrating aspects of a method for redistributing database tables in a distributed database. At 702, a database engine or some other implementing entity collects information about the distributed database. This information populates a set of table redistribution parameters, which may include table classification information 300, table placement rules 400, database landscape makeup and hardware constraints. The database landscape makeup includes a number of schemas, a number of tables and nodes, sizes of the tables, a utilization of the nodes, and a characteristic representative of an amount of asymmetry in data distribution across the landscapes, among other things. The hardware constraints include number of nodes, storage and memory capacity limitations of the different nodes, among other things. An example situation of a boundary case would involve adding one or more nodes, where the utilization of these new nodes would initially be zero. The implementing entity may determine whether or not a table redistribution is required, based on the information populated into the table redistribution parameters. Additionally, a user may determine that a table redistribution is required based on the table redistribution parameters, or other factors.

At 704 the implementing entity analyzes the table classification information 300, and learns the groupings that would improve query performance. Based on these groupings the implementing entity proposes table redistributing activities.

At 706 the implementing entity optionally analyzes the table placement rules 400, and learns the location 422 and partitioning rules 424, 426, 428 as described in reference to FIG. 4, FIG. 5, and FIG. 6. Based on some, or all of these rules and table redistribution behavior parameters, the implementation entity proposes table redistribution activities, including partitioning and repartitioning as required. It is noted that there may not be relevant rules, or that the condition to satisfy these rules may not be sufficient.

At 708 the implementing entity analyzes database landscape makeup and the hardware constraints as described in 702, and based on database landscape makeup and the hardware constraints the implementing entity proposes table redistribution activities to balance the resource usage of the distributed database. For example if memory usage on one node is at full capacity, and other nodes, or a new node has memory resources available, the implementing entity will propose a re-distributing activity to balance out these memory resource in-balances.

At 710 the implementing entity considers proposed table redistribution activities from 704, 706 and 708. Depending on the details of a particular table redistribution case, it is possible that only some of 704, 706, and 708 may generate proposed redistribution activities. Based on the proposed table redistribution activities, the implementation entity creates at least one table redistribution plan to a user. The user may select a preferred re-distribution plan, if more than one is provided, and the user may provide permission to execute the single, or selected table redistribution plan. The implementing entity may then execute the table redistribution plan, and redistributes tables within the distributed database in a manner similar to the examples provided in FIGS. 1 and 2. It is noted that at least in one implementation that without explicit user permission, the table redistribution plan will not be executed.

Figure 8:
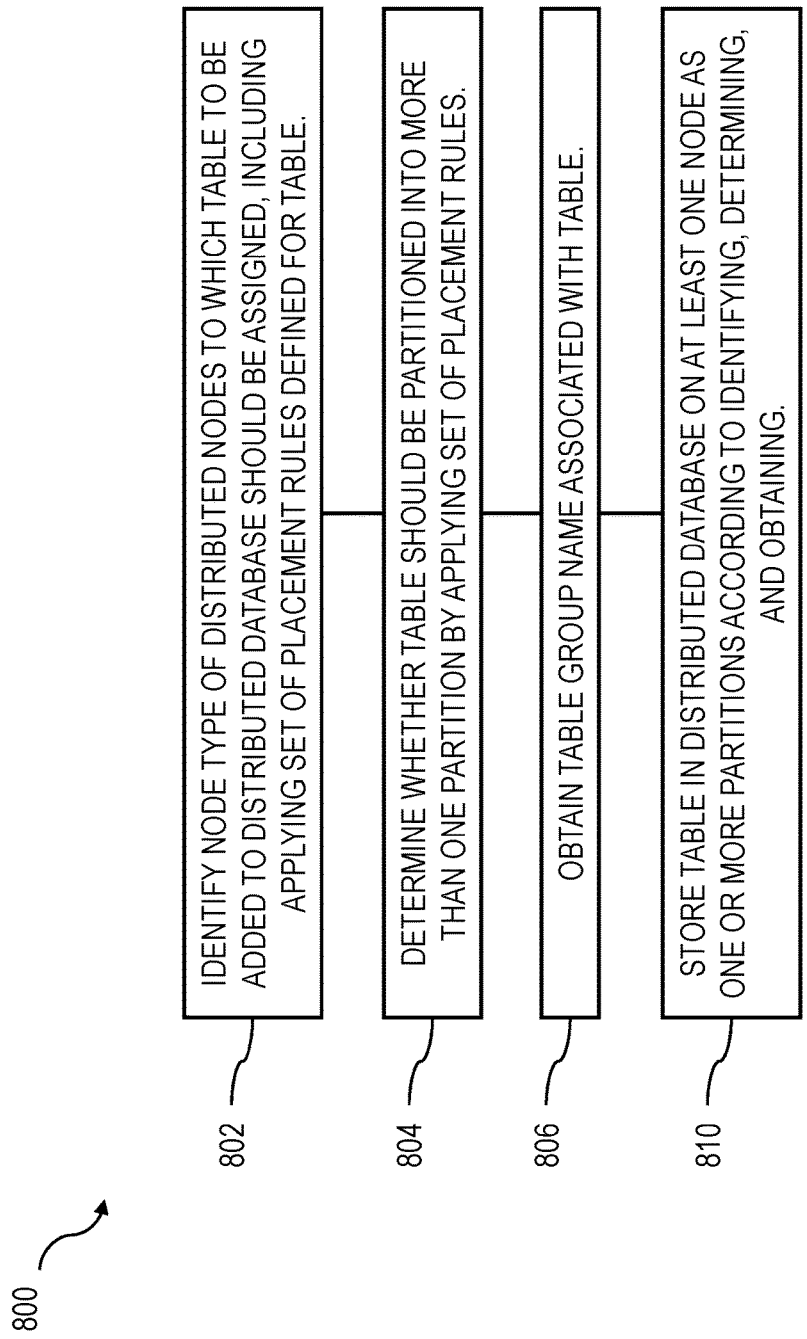

FIG. 8 shows another process flow diagram 800 illustrating aspects of a method for redistributing database tables in a distributed database. At 802, a node type of a plurality of distributed nodes to which a table to be added to a distributed database should be assigned, is identified. In some examples, the identifying includes applying a set of placement rules defined for the table. The distributed database includes a plurality of tables located on the plurality of distributed nodes. At 804, a determination is made whether the table should be partitioned into more than one partition, for example by applying the set of placement rules. A table group name associated with the table is obtained at 806, and at 810, the table is stored in the distributed database on at least one node of the plurality of nodes as one or more partitions according to the identifying, the determining, and the obtaining.

In some implementations of the current subject matter, automatic table redistribution may not occur on a distributed database. For example, even if table partitioning would be advantageous due to resource over-utilization or when threshold values for table re-partitioning are exceeded, these parameters can be considered during a next execution of table redistribution rather than occurring dynamically or automatically whenever a threshold or other parameter is exceeded or met. In still other implementations of the current subject matter, automatic table redistribution may occur on a distributed database.

By default, unless specified by a table redistribution behavior parameter, when the table redistribution is performed, tables can be moved to a new node with only their working memory part moved during runtime. The persistence part can be written to the new node during the next delta merge. However, if the specific table redistribution behavior parameter is selected, then the persistence part is moved immediately during the table redistribution. This however may significantly extend the runtime of the table redistribution.

Figure 9:
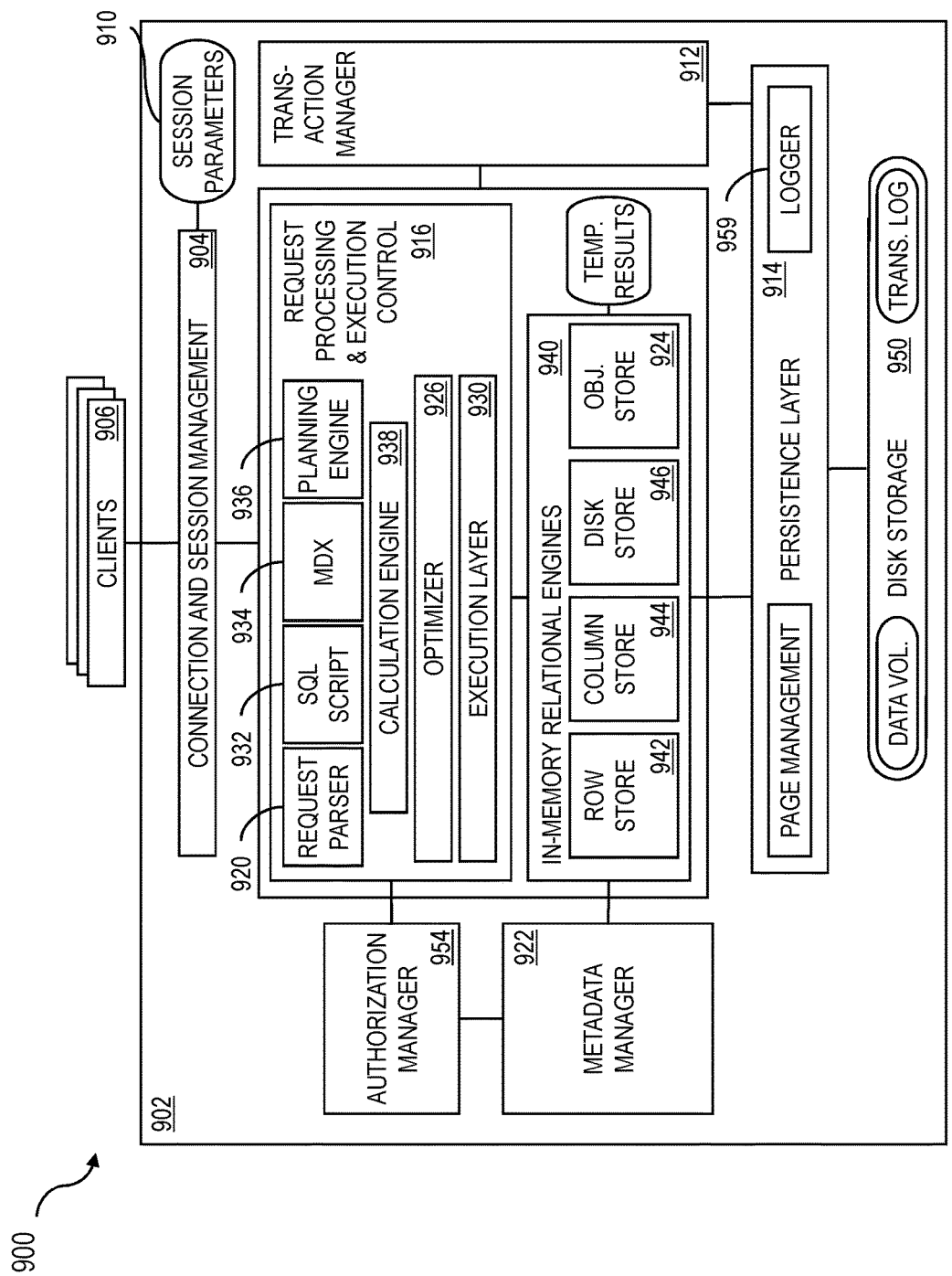
FIG. 9 shows a block diagram of an in-memory relational database server.

FIG. 9 shows a block diagram of an in-memory relational database server 900 consistent with implementations of the current subject matter. An in-memory relational database server 900 is an example of the implementation entity of FIG. 6. A connection and session management component 902 of an in-memory database system 904 creates and manages sessions and connections for the database clients 906. For each session a set of parameters 910 is maintained such as for example auto commit settings or the current transaction isolation level. Once a session is established, database clients 906 can use logical (e.g. SQL) statements to communicate with the in-memory database system 904. For analytical applications the multidimensional query language MDX can also be supported.

Each statement can be processed in the context of a transaction. New sessions can be implicitly assigned to a new transaction. A transaction manager 912 can coordinate transactions, control transactional isolation, and keep track of running and closed transactions. When a transaction is committed or rolled back, the transaction manager 912 can inform the involved engines about this event so they can execute necessary actions. The transaction manager 912 can cooperate with a persistence layer to achieve atomic and durable transactions.

Requests received from the database clients 906 can be analyzed and executed by a set of request processing and execution control components 916, which can include a request parser 920 that analyses a request from a database client 906 and dispatches it to a responsible component. Transaction control statements can, for example, be forwarded to the transaction manager 912, data definition statements can be dispatched to a metadata manager 922 and object invocations can be forwarded to an in-memory object store 924. Data manipulation statements can be forwarded to an optimizer 926, which creates an optimized execution plan that is provided to an execution layer 930. The execution layer 930 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 932, which is based on side effect free functions that operate on tables using SQL queries for set processing, can be used to enable optimizations and parallelization. The MDX language 934 can be used to provide support for multidimensional queries. A planning engine 936 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 932, MDX 934, and planning engine 936 operations can be implemented using a common infrastructure called a calculation engine 938. Metadata can be accessed via the metadata manager component 922. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 922.

One or more relational engines 940, for example an in-memory row store 942, an in-memory column store 944, a disk-based store 946, and the in-memory object store 924 mentioned above can communicate with the request processing and execution control components 916, the metadata manager 922, and the in-memory persistence layer 914. The row store 942 and column store 944 are each relational in-memory data engines that can store data in a row-based or column-based way, respectively. Some data, such as for example tracing data, need not be kept in memory all the time. The disk-based store 946 can handle such data. Data in the disk-based store 146 can be primarily stored in disk storage 950 and only moved to memory buffers (e.g. the persistence layer 914) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 914 can be responsible for durability and atomicity of transactions and can ensure that the database is restored to the most recent committed state after a restart and that transactions are either completely executed or completely undone. To achieve this goal in an efficient way, the persistence layer 914 can use a combination of write-ahead logs, shadow paging and save points. The persistence layer 914 can offer interfaces for writing and reading data and can also contain a logger 952 that manages the transaction log. Log entries can be written implicitly by the persistence layer 914 when data are written via a persistence interface or explicitly by using a log interface.

An authorization manager 954 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

Implementations of the current subject matter can include features of distributed architectures that provide table redistribution support and table placement rules implementations that enable improved query performance and balance out the resources in a distributed relational database.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory machine-readable medium storing instructions that, when executed by at least one programmable processor, cause the at least one programmable processor to perform operations comprising:
    identifying a table stored across a plurality of partitions in a distributed database, the distributed database comprising a plurality of tables located on a plurality of distributed nodes;
    detecting that an average record count of the plurality of partitions is at or above a record threshold;
    determining that a number of available nodes in the plurality of distributed nodes is at or above a node threshold, wherein the node threshold is equal to at least twice a number of partitions in the plurality of partitions;
    dividing, based on classification information for the table and a placement rule defined for the table, at least one of the plurality of partitions into more than one partition by creating a new partition for the at least one of the plurality of partitions; and
    placing, based on the classification information and the placement rule, the new partition onto at least a portion of the available nodes.

2. A computer program product as in claim 1, wherein the record threshold is specified in a set of placement rules including the placement rule defined for the table, wherein the classification information includes a schema name, a table name, and/or an application type, and wherein the set of placement rules includes partitioning information.

3. A computer program product as in claim 1, wherein the dividing comprises dividing each of the plurality of partitions into two new partitions, and wherein the operations further comprise placing each of the new partitions onto at least a portion of the available nodes.

4. A computer program product as in claim 3, wherein the operations further comprise:
    identifying a server type for the table, wherein the available nodes are only determined to be available when they are of the server type, and wherein each the new partitions are placed only onto nodes having the server type.

5. A system comprising:
computer circuitry configured to perform operations comprising:
identifying a table stored across a plurality of partitions in a distributed database, the distributed database comprising a plurality of tables located on a plurality of distributed nodes;
detecting that an average record count of the plurality of partitions is at or above a record threshold;
determining that a number of available nodes in the plurality of distributed nodes is at or above a node threshold, wherein the node threshold is equal to at least twice a number of partitions in the plurality of partitions;
dividing, based on classification information for the table and a placement rule defined for the table, at least one of the plurality of partitions into more than one partition by creating a new partition for the at least one of the plurality of partitions; and
placing, based on the classification information and the placement rule, the new partition onto at least a portion of the available nodes.

6. A system as in claim 5, wherein the record threshold is specified in a set of placement rules including the placement rule defined for the table, wherein the classification information includes a schema name, a table name, and/or an application type, and wherein the set of placement rules includes partitioning information.

7. A system as in claim 5, wherein the dividing comprises dividing each of the plurality of partitions into two new partitions, and wherein the operations further comprise placing each of the new partitions onto at least a portion of the available nodes.

8. A system as in claim 7, wherein the operations further comprise:
identifying a server type for the table, wherein the available nodes are only determined to be available when they are of the server type, and wherein each the new partitions are placed only onto nodes having the server type.

9. A system as in claim 5, wherein the computer circuitry comprises:
at least one programmable processor; and
a machine-readable medium storing instructions that, when executed by the at least one programmable processor, cause the at least one programmable processor to perform the operations.

10. A computer-implemented method comprising:
identifying a table stored across a plurality of partitions in a distributed database, the distributed database comprising a plurality of tables located on a plurality of distributed nodes;
detecting that an average record count of the plurality of partitions is at or above a record threshold;
determining that a number of available nodes in the plurality of distributed nodes is at or above a node threshold, wherein the node threshold is equal to at least twice a number of partitions in the plurality of partitions;
dividing, based on classification information for the table and a placement rule defined for the table, at least one of the plurality of partitions into more than one partition by creating a new partition for the at least one of the plurality of partitions; and
placing, based on the classification information and the placement rule, the new partition onto at least a portion of the available nodes.

11. A computer-implemented method as in claim 10, wherein the record threshold is specified in a set of placement rules including the placement rule defined for the table, wherein the classification information includes a schema name, a table name, and/or an application type, and wherein the set of placement rules includes partitioning information.

12. A computer-implemented method as in claim 10, wherein the dividing comprises dividing each of the plurality of partitions into two new partitions, and wherein the method further comprises placing each of the new partitions onto at least a portion of the available nodes.

13. A computer-implemented method as in claim 12, further comprising:
identifying a server type for the table, wherein the available nodes are only determined to be available when they are of the server type, and wherein each the new partitions are placed only onto nodes having the server type.

14. A computer-implemented method as in claim 10, wherein the identifying, the identifying, detecting, determining, dividing, and placing are performed by at least one system comprising computer circuitry.

* * * * *